Dec. 31, 1963
W. J. KOPPIUS
3,116,066
MATING RING AND SEAL
Filed Oct. 17, 1960
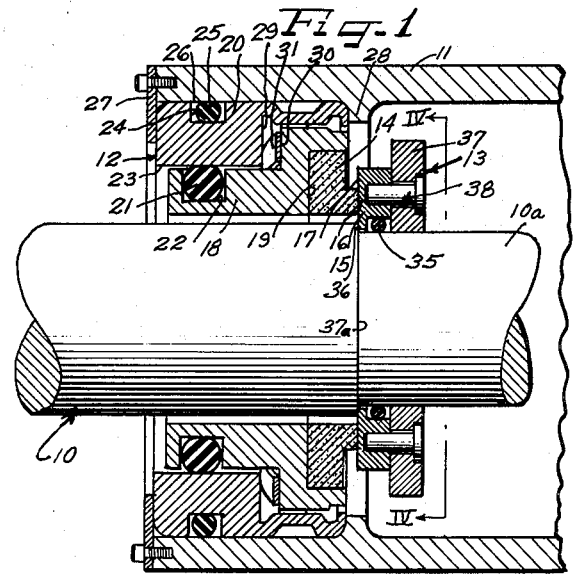
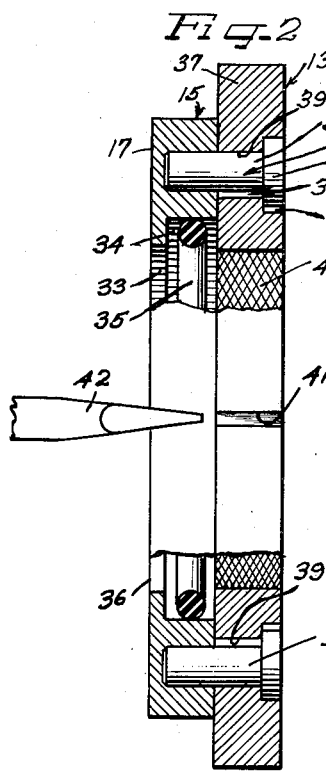
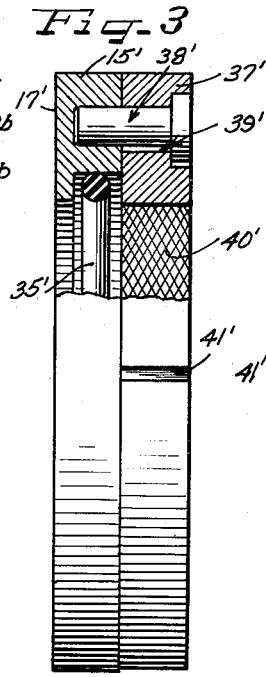
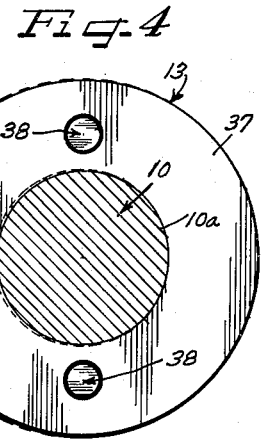
INVENTOR.
Wibrandus J. Koppius
BY
ATTORNEYS United States Patent Office 3,116,066
Patented Dec. 31, 1963

3,116,066
MATING RING AND SEAL
Wibrandus J. Koppius, Lyons, Ill., assignor to Gits Bros. Mfg. Co., Chicago, Ill., a corporation of Illinois
Filed Oct. 17, 1960, Ser. No. 63,172
5 Claims. (Cl. 277—38)

The present invention relates to improvements in rotary seals and particularly to a rotary seal having an improved mating ring assembly which is attached to a rotating shaft member.

In a preferred arrangement the invention contemplates the provision of a rotary seal of the type wherein a carbon sealing ring is supported on a carrier ring which is urged by a spring into sealing engagement with a mating ring attached to a rotating shaft member. A casing ring is supported in a housing and provides a backing for the spring. Important features of the invention are embodied in the mating ring assembly which includes a mating sealing ring having an annular axially facing smooth sealing face for sealing engagement with the carbon sealing ring. Means are provided for a yieldable seal between the rigid mating ring and the rotary shaft member. The mating ring is supported for rotation with the shaft by a releasable holding or clamping ring which is split and formed of spring steel so that when released it will grip the outer surface of the shaft and hold the mating ring in position against a radial shoulder on the shaft. The clamping ring is attached to the rigid mating ring by means which permits the clamping ring to be spread apart and released without imposing radial forces on the mating ring.

Accordingly an object of the present invention is to provide a rotary seal with an improved mating ring assembly.

Another object of the invention is to provide a mating ring assembly which can be quickly and easily attached to a shaft for rotation therewith and which will hold itself firmly and accurately to the shaft to provide a stable and accurate support for an annular sealing face.

Another object of the invention is to provide an improved mating ring for a rotary seal which is clamped to a rotating shaft member and which can easily be removed and replaced with a simple spreading tool.

Another object of the invention is to provide an improved mating ring assembly for a rotary seal, which is of simplified lightweight construction and which accurately and reliably supports itself on the shaft without requiring cutting or adaptation of the shaft to hold the mating ring.

Other objects and advantages will become more apparent with the teaching of the principles of the invention in connection with the disclosure of the preferred embodiments thereof in the specification, claims and drawings, in which:

FIGURE 1 is a sectional view taken through a seal assembly embodying the principles of the present invention;

FIGURE 2 is an enlarged elevational view with portions broken away showing the mating ring assembly;

FIGURE 3 is an elevational view with portions broken away showing another form of the mating ring assembly; and FIGURE 4 is a vertical sectional view taken substantially along line IV—IV of FIGURE 1.

As shown on the drawings:

As shown in FIGURE 1, a rotary member 10, shown in the form of a shaft, is provided with a rotary seal to prevent the passage of fluids along the shaft. Such seals have various uses and, for example, may provide a seal for a motor shaft for a motor enclosed in a housing 11 and explosive or corrosive gases are prevented from entering the motor housing.

The rotary seal includes a seal assembly unit 12 comprised of assembled parts which are held in the housing and coact with a mating ring assembly 13 which is shown in greater detail in FIGURES 2 and 4.

The seal itself is formed between a sealing ring 14 and a mating ring 15. The sealing ring 14 is formed of carbon or other similar long wearing sealing material and has an annular sealing face 16. The mating ring 15 has a smooth annular sealing face 17 and the sealing faces 16 and 17 meet in a radial plane forming an annular seal around the shaft 10. The sealing ring 14 is supported on the seal assembly 12 and urged axially against the mating ring 15 which is mounted on the shaft 10 to rotate therewith.

While the drawings illustrate a preferred arrangement for a sealing unit 12, it will be understood that other forms of sealing units may be employed with the mating ring assembly 13. The sealing unit 12 includes a carrier ring 18 having an annular recessed socket 19 in which is positioned the sealing ring 14, being bonded or cemented in place. Surrounding the carrier ring 18 is a casing ring 20 which is mounted in the housing 11.

Between the casing ring 20 and the carrier ring 18 is a sliding seal including an O-ring 21 mounted in an outwardly facing groove 22 in the carrier ring and sealingly engaging an inner cylindrical sealing surface 23 in the casing ring 20.

The casing ring 20 is sealed to the housing by an O-ring 25 mounted in an outwardly facing groove 24 in the casing ring and sealingly engaging the inner cylindrical surface 26 of the housing 11. The sealing unit 12 is held in place by a washer 27 attached to the housing and the washer holds the seal unit 12 against an annular inwardly projecting rib 28 in the housing.

The casing ring has a radial shoulder 29 and the carrier ring has a radial shoulder 30 and between these radial annular shoulders is a wave spring 31 which urges the sealing ring 14 into continual sealing engagement with the rotating mating ring 15.

The mating ring assembly 13, FIGURES 1, 2 and 4, holds itself in place tightly gripping the rotating shaft. It secures itself to the shaft without requiring adaptation of the shaft or requiring special attaching apparatus and without requiring drilling of the shaft. For aiding in holding the sealing face 17 of the mating ring 15 in an accurate radial plane at exact right angles to the axis of the shaft 10, a radial shoulder 37a is provided by a reduced portion 10a of the shaft. While this shoulder is not absolutely essential, its use is advantageous and preferred in that it provides an accurate guide for installation of the mating ring assembly. In applying the mating ring assembly it can be simply installed by sliding into position on the shaft against the shoulder 37a. The shoulder 37a is engaged by an inner portion 36 of the radial sealing face 17 and the portion 36 is preferably coplanar with the sealing surface 17 and must be parallel thereto to insure that the sealing surface 17 will move in a true and accurate radial plane to prevent chattering and excessive wear of the sealing surface during operation.

The mating ring is rigid and in one piece so that it will not distort or warp and is non-rigidly supported in a radial direction on the shaft 10 by a sealing means 35 shown in the form of an O-ring mounted in a recess 34 cut in the inner surface 33 of the mating ring. The inner surface 33 is of a diameter larger than the diameter of the portion 10a of the shaft so that the mating ring will not ride on the shaft. The O-ring 35 thus provides a seal and yet permits sliding the mating ring off of the shaft 10.

The mating ring is supported in an axial and rotational direction by a holding or clamping ring 37. Centering or radial support is provided by the O-ring 35. The clamping ring 37 is attached to carry the mating ring 15 but is attached so that it can spread and contract radially without imposing radial forces on the mating ring 15. For this purpose, axially extending pins 38 are mounted in the mating ring 15 and project into axially bored holes 39 which are of a larger diameter than the pins 38 so that the mating ring 37 is free to spring fully closed without the sides of the holes 39 engaging the pin. Similarly, the clamping ring 37 can be spread without the pins engaging the sides of the holes. As illustrated, the pins have body portions 38a and head portions 38b and the holes have a smaller portion 39a to receive the body portion 38a of the pins, and have a larger portion 39b to receive the head portion 38b of the pins, with a shoulder formed between said hole portions being engaged by the base of the heads 38b to hold the clamping ring 37 against the mating ring 15 and the facing surfaces of the rings are in sliding engagement.

As will be observed from the drawings, the clamping ring 37 has an axially facing side support surface in a plane normal to the ring axis facing the mating ring 15. Similarly, the mating ring 15 has an axially facing side support surface in a plane normal to the ring axis facing the clamping ring 37 and said surfaces engage each other to axially support the mating ring. When the sealing ring is pushed toward the mating ring 15 it is supported in an axial direction by surface to surface engagement with the clamping ring 37.

For purposes of gripping the shaft the clamping ring 37 is of spring steel and is split so as to form a narrow gap 41. The clamping ring also has a roughened or knurled inner gripping surface 40 for gripping the surface of the shaft 10. When the mating ring assembly is to be installed or removed from a shaft, a simple tool such as a screw driver 42 is inserted into the gap 41 to spread the resilient ring 37. For installation the spread ring is slid over a shaft and released and for removal the ring is again spread and slid off of the shaft.

In the structure of FIGURE 2, the clamping ring 37 is of a larger diameter than the mating ring 15 so that the spreading tool or screw driver 42 can engage the gap 41 in an axial direction. If limited space is available and the operator has to reach inside of a housing this permits the screw driver to be inserted in an axial direction.

In the arrangement of FIGURE 3, the clamping ring is the same size as a mating ring. As illustrated, a mating ring 15' has an annular smooth sealing surface 17' and is provided with an O-ring 35' for sealing against a shaft. A clamping ring 37' is of the same outer diameter as the mating ring and pins 38' are secured to the mating ring 15' and extend into holes 39' in the clamping ring to support the mating ring on the clamping ring. The clamping ring is provided with a gap 41' for spreading it and installing it on a shaft and has an inner roughened surface 40' for gripping the shaft.

As a brief summary of operation, as shown in FIGURES 1, 2 and 4, for installing the seal on a rotating shaft 10 the mating ring assembly 13 is handled by inserting a screw driver 42 in the slot 41 in the clamping ring 37 to spread the clamping ring. The rings 15 and 37 are then slid on the reduced portion 10a of the shaft against the shoulder 37a and the clamping ring 37 is released by removing the screw driver 42. The mating ring assembly 13 is thus firmly and accurately held in place for continued operation of the seal and is supported against the sealing ring 14 which is spring urged into engagement with the mating ring 15.

Thus it will be seen that I have provided an improved rotary seal assembly incorporating a mating ring assembly, which meets the objectives and advantages hereinabove set forth. The mating ring assembly provides a simplified lightweight unit which is easily used for providing seals for existing shafts or in new installations and is readily and quickly removed for cleaning, inspection or replacement.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. An assembly for supporting a mating sealing surface for a rotary seal having an annular sealing ring supported by a carrier ring with the carrier ring spring urged by a spring bottomed against a casing ring to hold the sealing ring in sealing position against the sealing surface, said assembly comprising a mating ring having an annular sealing surface for engagement by a sealing ring, a shaft passing concentrically through the mating ring, means for forming a flexible seal between the mating ring and the shaft, a shoulder on the shaft having a radial surface in a radial plane of the shaft in abutting contact with a radial surface of the mating ring to hold the sealing surface of the mating ring in an accurate radial plane, a split spring metal clamping ring having an inner clamping surface and a diameter in a released position smaller than the outer surface of the shaft to grip the shaft with said mating ring positioned between the clamping ring and the shoulder so that the clamping ring will hold the mating ring against the shoulder, and means for attaching the mating ring to the clamping ring without imposing radial forces on the mating ring.

2. A mating ring assembly for a rotary seal comprising a mating sealing ring having an annular smooth sealing face for sealing engagement with a sealing ring held against said face, means for forming a yieldable seal between said mating ring and a rotary shaft member, a split spring metal clamping ring having an inner clamping surface and a released diameter smaller than the outer surface of the rotary shaft member to be gripped, pins having headed bodies secured to the mating ring and extending into the clamping ring, and means defining openings in the clamping ring receiving the bodies of the pins being of a diameter larger than the pin bodies to permit radial expansion of the clamping ring without imposing radial forces on the mating ring.

3. A mating ring assembly for a rotary seal comprising a mating sealing ring having an annular smooth sealing face for sealing engagement with a sealing ring held against said face, means forming a yieldable seal between said mating ring and a rotary shaft member, a split spring metal clamping ring having an inner clamping surface and a released diameter smaller than the outer surface of the rotary shaft member to be gripped, said clamping ring having an outer diameter larger than the outer diameter of said mating ring and the ends of the clamping ring being sufficiently close for the insertion of a spreading tool to spread the clamping ring and release it from the shaft, and means for attaching the mating ring to the clamping ring permitting radial expansion of the mating ring relative to the clamping ring without imposing radial forces on the mating ring.

4. A mating ring assembly for a rotary seal comprising a mating sealing ring having an annular smooth sealing face for sealing engagement with a sealing ring held against said face, means for forming a yieldable seal between said mating ring and a rotary shaft member, a split spring metal clamping ring having an inner clamping surface and a release diameter smaller than the outer surface of the rotary shaft member to be gripped, said clamping ring having an axially facing side support surface in a plane normal to the ring axis, said mating ring having an axially facing side surface in a plane normal to the ring axis engaging said support surface for axially supporting said mating ring, and a connecting means between said rings yieldable in a radial direction to permit radial expansion of the clamping ring without imposing radial forces on the mating ring.

5. A mating ring assembly for a rotary seal comprising a mating sealing ring having an annular smooth sealing face for sealing engagement with a sealing ring held against said face, means for forming a yieldable seal between said mating ring and a rotary shaft member, a split spring metal clamping ring having an inner clamping surface and a release diameter smaller than the outer surface of the rotary shaft member to be gripped, said clamping ring having an axially facing side support surface in a plane normal to the ring axis, said mating ring having an axially facing side surface in a plane normal to the ring axis engaging said support surface for axially supporting said mating ring, and a connecting means between said rings including pins extending axially and secured to one of said rings and extending into openings in the other of said rings, and means defining said openings in said other ring receiving the pins and being of a diameter larger than the pins to permit radial expansion of the clamping ring without imposing radial forces on the rating ring.

References Cited in the file of this patent

UNITED STATES PATENTS

| | | |
|---|---|---|
| 2,037,144 | Olson | Apr. 14, 1936 |
| 2,405,464 | Storer | Aug. 6, 1946 |
| 2,984,507 | Welch | May 16, 1961 |

FOREIGN PATENTS

| | | |
|---|---|---|
| 733,430 | Great Britain | July 13, 1955 |